Patented Feb. 21, 1950

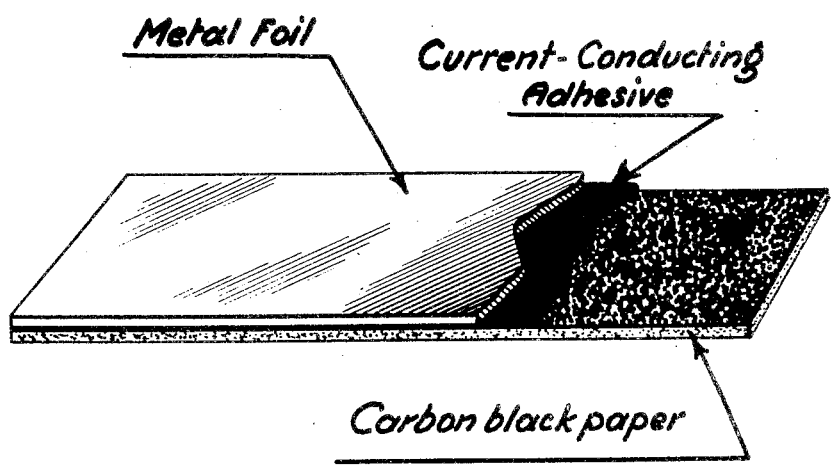

2,498,493

UNITED STATES PATENT OFFICE 2,498,493

ELECTRICALLY CONDUCTING COMPOSITE SHEET

Latimer F. Hickernell, Irvington, N. Y., assignor to Anaconda Wire and Cable Company, a corporation of Delaware Application June 22, 1945, Serial No. 600,995

1 Claim. (Cl. 174—126)

This invention relates to sheet material including a metal foil bonded to paper, and has for its object the provision of an improved sheet of this character. More particularly, the invention pertains to a sheet particularly suitable for use in connection with electrical conductors, and provides an improved composite sheet formed of carbon-impregnated paper and metal foil so united together that the sheet is a good conductor of electricity through the sheet from outside to outside, in other words, in a direction transversely through the sheet.

I have found that the carbon-impregnated and current-conducting paper may be bonded to metal foil with a current-conducting adhesive to form a composite sheet that is highly current conducting in directions both longitudinally and transversely of the sheet. The composite sheet is especially effective and intended for use where it is desired to obtain the benefits of the carbon-impregnated paper as an adsorbing medium, yet with the physical protection and electrical conductivity which the metal affords, in a direction at right angles to the sheet thickness. In accordance with my invention, I bond the paper to the metal foil with a current-conductive adhesive having low resistance properties, and preferably one containing dispersed particles of carbon, such as channel black, acetylene black or graphite. The adhesive, used in my invention, has such low resistivity that the composite sheet is a very good conductor of electricity in a direction through the adhesive.

I may use any suitable thin sheet metal, such as copper, magnesium, lead, aluminum, or the like. Aluminum foil is especially advantageous in forming my composite sheet when it is to be used for a wrapping on electrical conductors. The carbon black may be placed and held in position on the paper in any suitable manner. Preferably the carbon black is incorporated in the pulp during the paper manufacture. While I may use any form of adsorptive carbon, I prefer to use a low particle size, clean grade of carbon black such as is made by the incomplete combustion of hydrocarbons. A more complete description of a suitable form of carbon black impregnated paper is described in the United States patent to Samuel J. Rosch No. 2,102,129. According to said patent, the carbon black adsorbs certain impurities from the insulating oil with which the power cables are filled.

The composite sheet material of my invention may be applied to electrical conductors in tape form, for example, as a wrapping over oil-impregnated insulation, for the purpose of adsorbing impurities from the oil and providing electrical conductivity through the composite sheet. An example of such use of the sheet material of this invention is described and claimed in my copending application Serial No. 600,996, filed June 22, 1945.

My invention will be better understood after considering the following discussion taken in conjunction with the accompanying drawing. The layer of paper has the particles of carbon black distributed therethrough and is preferably formed by mixing the carbon black with the pulp in the paper making operation. The layer of adhesive may be applied to either the metal foil, for example, aluminum foil, or to the paper, and the two sheets are pressed together to form the bond.

A current-conducting adhesive suitable for use in my invention preferably includes an appreciable amount of finely divided carbon, for example graphite, acetylene or channel black in an amount varying from 1% to 50%.

Suitable adhesive compositions or bonding cements in which a carbon black pigment can be dispersed along with the other ingredients to increase the conducting properties may contain casein or a caseinate, urea and casein, urea and formaldehyde condensation products, polyvinyl alcohol, phenol and formaldehyde condensation products, polyvinyl acetate, polyvinyl acetal, polyvinyl formal, polyvinyl butyral, terpene and abietic acid resins and esters, a cellulose ester like cellulose acetate in a suitable solvent or a cellulose ether like ethyl cellulose in a solvent together with a softening agent, a starch such as arrowroot or potato starch or a dextrin dissolved in water, a rubber compound cement such as natural smoke sheet stock dissolved in benzol, or a butadiene-styrene copolymer in a solvent. These materials constitute the base of the adhesive.

In the formulation of these conducting adhesive compounds, the carbon, preferably in the form of carbon black, is blended in with the base dissolved in a solvent, with a suitable plasticizer or softening agent added to form a smooth dispersion of the carbon in the liquid. The resulting adhesive can be spread, calendered, brushed or sprayed on the paper or on the metal foil to effect an adhesive surface with conducting properties. The foil and paper, either or both of which are thus coated with the adhesive, are placed in contact with one another and pressed together so as to form an intimate bond. This adhesive bond is a good conductor of electricity.

Typical examples of current-conducting adhesives follow:

Example 1

| | Parts |
|---|---|
| Polyvinyl acetate | 10 |
| Methyl ethyl ketone | 30 |
| Tricresyl phosphate | 5 |
| Channel black ("easy processing") | 5 |

The above mixture is ground to a smooth paste and spread on carbon black paper and the metallic foil is then pressed over the adhesive.

*Example 2*

|  | Parts |
|---|---|
| Arrowroot starch | 10 |
| Distilled water | 50 |
| Channel black ("easy processing") | 5 |

The starch is suspended in water, the black is stirred in and the mixture heated gently to cause thickening. This is knife-spread on carbon black paper and the metal foil pressed thereover.

Where the metallic foil and the paper are bonded together with a non-conducting adhesive, successive layers of the combined sheet of foil and conducting paper become insulated electrically and tend to act as a condenser retaining an electrical charge on the foil coating. This invention is an improvement upon foil coatings on cellulosic materials to render the adhesive or cement bond electrically conducting so as to dissipate an electrical charge on the metal foil and permit continuous passage of an electric current.

Typical data obtained experimentally on carbon black paper tapes, with and without foil coatings, applied with various types of adhesives, are as follows:

|  | Transverse resistance, ohms per sq. inch sheet |
|---|---|
| Uncoated carbon black sheet | 41.8 |
| Aluminum foil coated carbon black sheet with potato starch adhesive | 12,800 |
| Aluminum foil coated carbon black sheet with arrowroot starch adhesive | 2,290 |
| Aluminum foil coated carbon black sheet with conducting adhesive |  |
| (a) Starch type including carbon | 50.4 to 95.7 |
| (b) Vinyl acetate type including carbon | 181 to 341 |

I claim:

A composite sheet for oil-filled electrical apparatus, said sheet being electrically conducting both longitudinally and transversely and presenting an adsorptive medium for the insulating oil and comprising a sheet of paper impregnated with adsorptive carbon black to provide the adsorptive medium for impurities in the oil, and a layer of metal foil bonded to the adsorptive carbon-impregnated paper with a current-conducting adhesive having particles of carbon dispersed therein in an amount ranging from 1% to 50% by weight of the adhesive.

LATIMER F. HICKERNELL.

REFERENCES CITED

The following references are of record in the file of this patent:

UNITED STATES PATENTS

| Number | Name | Date |
|---|---|---|
| 2,019,297 | Faucett | Oct. 29, 1935 |
| 2,102,129 | Rosch | Dec. 14, 1937 |
| 2,233,206 | Frederick | Feb. 25, 1941 |
| 2,315,039 | Beede | Mar. 30, 1943 |

FOREIGN PATENTS

| Number | Country | Date |
|---|---|---|
| 401,001 | Great Britain | Nov. 6, 1933 |